US007069594B1

(12) United States Patent
Bolin (10) Patent No.: US 7,069,594 B1
(45) Date of Patent: Jun. 27, 2006

(54) FILE SYSTEM LEVEL INTEGRITY VERIFICATION AND VALIDATION

(75) Inventor: Christopher Bolin, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 860 days.

(21) Appl. No.: 09/882,585

(22) Filed: Jun. 15, 2001

(51) Int. Cl.
*G06F 17/30* (2006.01)
*G06F 11/00* (2006.01)

(52) U.S. Cl. .......................................... 726/26; 726/24
(58) Field of Classification Search ................ 713/200; 714/7, 54, 21, 8, 6; 707/206, 201, 202; 726/25, 726/22, 24
See application file for complete search history.

(56) References Cited

U.S. PATENT DOCUMENTS

| 5,475,826 | A | * | 12/1995 | Fischer | 707/1 |
| 5,483,649 | A | * | 1/1996 | Kuznetsov et al. | 713/200 |
| 5,537,540 | A | * | 7/1996 | Miller et al. | 714/38 |
| 5,694,569 | A | * | 12/1997 | Fischer | 711/216 |
| 5,802,277 | A | * | 9/1998 | Cowlard | 713/200 |
| 6,338,141 | B1 | * | 1/2002 | Wells | 713/200 |
| 6,415,280 | B1 | * | 7/2002 | Farber et al. | 707/2 |
| 6,615,365 | B1 | * | 9/2003 | Jenevein et al. | 714/6 |
| 2002/0026591 | A1 | * | 2/2002 | Hartley et al. | 713/201 |
| 2003/0200207 | A1 | * | 10/2003 | Dickinson | 707/3 |
| 2004/0117362 | A1 | * | 6/2004 | Nunez | 707/3 |

* cited by examiner

*Primary Examiner*—Kim Vu
*Assistant Examiner*—Linh Son
(74) *Attorney, Agent, or Firm*—Zilka-Kotab, PC; Christopher J. Hamaty (57) ABSTRACT

An integrity verifier and validator is provided in which an initial anti-virus scan is performed against an entire file system to verify the integrity of the file system and create a corresponding file system level integrity verification database of known scanned regions of the file system. The database contains a copy of the file system's partition table referencing the range of occupied inodes and directory blocks. When new or updated content is written to the file system the integrity of the corresponding occupied inodes and directory blocks is no longer assured, and the integrity verifier flags them on the database for rescanning. Subsequent attempts to rescan any portion of the file system triggers the integrity validator to scan the database to validate whether that portion of the file system falls within any of the occupied inodes or directory blocks that have been flagged for rescanning. If they are not flagged, then rescanning of that portion of the file system is unnecessary as the integrity of at least that portion is assured. However, if they are flagged, then the anti-virus software rescans that portion of the file system for the presence of viruses.

36 Claims, 4 Drawing Sheets

FILE SYSTEM LEVEL INTEGRITY VERIFICATION AND VALIDATION

FIELD OF THE INVENTION

The invention generally relates to scanning data for the presence of certain characteristics, such as virus code, and more particularly to preventing the rescanning of previously scanned files.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2000, Networks Associates Technology, Inc., All Rights Reserved.

BACKGROUND

With the advent of general access computer networks, such as the Internet, people may now easily exchange application programs and application data between computer systems. Unfortunately, some people have taken advantage of such easy data exchange by developing computer "viruses" designed to spread among and sometimes attack interconnected devices, such as networked computers. A virus is application code that executes on one's computer without one's knowledge, and against one's interests. Viruses tend to replicate themselves within all interconnected devices, allowing an exponential "infection" of other devices.

In response to the security threat intrinsic to viruses, anti-virus programs were developed to identify and remove viruses. Anti-virus programs use virus scanners to scan individual files, groups of files, or the entire hard drive or drives of a computer system for known viruses in a number of ways, such as by comparing each file to a list of "virus signatures" that are stored in "virus signature files" or by emulating computer instructions contained within the file to evaluate the effect of the instructions. The scanning can be done upon request of a user, when the file is accessed on a mass storage device such as by an application, or on a scheduled basis. Virus scanning is, therefore, a resource intensive (both in CPU and disk I/O usage) and time-consuming task, especially in the case of access scanning. Oftentimes, a user's file-open request must be delayed until the file can be scanned and possibly cleaned. This resource consumption can lead to a degradation of a computer's overall performance and slower response times for users.

In light of the foregoing, it is not surprising that a universal problem in anti-virus scanning is the length of time required to scan a file for viruses. This problem has been exacerbated in recent years for a number of reasons. One reason is simply that file sizes are growing ever larger, thereby increasing the average amount of time to scan a given file. Oftentimes, the files are so large that they are compressed and stored as archives. The term archive as used herein includes traditional archive data formats such as ZIP, ZOO, LHA, ARC, JAR, LZW, etc. that contain compressed collections of data files, in addition to other data formats that may embed other files, e.g., Microsoft Word (e.g., ".DOC") documents, Rich Text Format (RTF) files, Object Linking and Embedding (OLE) containers, etc. Scanning archives and documents containing embedded objects takes additional time and resources to scan. In some cases, the virus developers manufacture "malicious" files which purposefully take a long time to scan, because they themselves are large files such as archives and documents containing embedded objects.

In addition to growing file sizes, another reason why anti-virus scanning technology is taking longer is the growing number of drives in a typical computer system as well as the growth in the size of the drive's storage medium itself. Adding to the problem is the explosive growth in the number of viruses for which the file, groups of files, or drives must be scanned.

One way to reduce the amount of time and computer resources required by anti-virus scanning is to prevent the needless rescanning of a previously scanned file. A number of techniques to prevent rescanning have been implemented in anti-virus scanning technology; however, none of them have adequately addressed the problem. These techniques share the concept of saving a set of parameters, an AV "state," for the file as of the last scan so that once a file has been scanned and found free of infection, it should not need to be scanned again unless the file is modified. The parameters chosen for the AV state are indicative of virus infection if changed, such as the file's length, checksum, and date of last file write operation.

For example, a common approach is to verify the integrity of a file by using a cyclical redundancy check (CRC) which generates a unique number when applied to a given file, often referred to as a checksum. The checksum remains unchanged as long as the file is unchanged. However, generating and verifying the checksum for each file is time-consuming and often uses more resources than simply performing the anti-virus scan itself. Indeed, the cost of generating a checksum for every file on every scan prohibits implementation given the constraints on the processing power and speed of today's computer systems.

Another approach is to maintain a database of file date, time, and size information, and compare the files to be scanned against the database to determine if there is a difference which indicates that the file should be scanned. This approach has proved easy to circumvent, however, by redirecting the database updates to another file.

What is needed, therefore, is an improved method of preventing the needless rescanning of previously scanned files. The above-mentioned shortcomings, disadvantages and problems are addressed by the present invention, which will be understood by reading and studying the following specification.

SUMMARY OF THE INVENTION

According to one aspect of the present invention, an integrity verifier and validator performs an initial anti-virus scan against an entire file system to verify the integrity of the file system and create a corresponding file system level integrity verification database of known scanned regions of the file system. The database contains a copy of the file system's partition table referencing the range of occupied inodes and directory blocks. When new or updated content is written to the file system the integrity of the corresponding occupied inodes and directory blocks is no longer assured, and the integrity verifier flags them on the database for rescanning.

According to one aspect of the present invention, subsequent attempts to rescan any portion of the file system triggers the integrity verifier and validator to scan the database to validate whether that portion of the file system falls within any of the occupied inodes or directory blocks that have been flagged for rescanning. If they are not flagged, then rescanning of that portion of the file system is unnecessary as the integrity of at least that portion is assured. However, if they are flagged, then the anti-virus software may rescan that portion of the file system for the presence of viruses.

Because the integrity scan is performed against the integrity verification database at the higher file system level instead of the lower individual file or directory level, the processing overhead is less, resulting in a more efficient method of preventing needless rescanning of previously scanned files. While it is contemplated that the integrity verifier and validator will be used for requests to scan entire hard drives, disks, CD-ROMs and the like, it could just as easily be used for requests to scan individual objects such as individual files or archives. However, the larger the portion of the file system that is requested to be rescanned, the greater the level of efficiency that can be achieved using the present invention to prevent needless rescanning. In addition to the aspects and advantages of the present invention described in this summary, further aspects and advantages of the invention will become apparent by reference to the drawings and by reading the detailed description that follows.

BRIEF DESCRIPTION OF THE DRAWINGS

Features and advantages of the invention will become apparent to one skilled in the art to which the invention pertains from a review of the following detailed description and claimed embodiments of the invention in conjunction with the drawings, and in which:

DETAILED DESCRIPTION

In the following description various aspects of the present invention, a method and apparatus for verifying and validating the integrity of an object, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well-known features may be omitted or simplified in order not to obscure the present invention.

Parts of the description will be presented using terminology commonly employed by those skilled in the art to convey the substance of their work to others skilled in the art, including terms of operations performed by a computer system or virus scanner, and their operands. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

A virus scanner must be capable of quickly detecting and disposing of malicious files, emails, archives, or other objects that may be infected with a virus. Otherwise, accessing the malicious object can result in the temporary or even prolonged disablement or stalling of all virus scanning and/or file activity of the scanner's host system. When scanning large collections of objects, such as entire hard drives, disks, or CD-ROMs, any delay associated with scanning is compounded. When the virus scanner is disabled, the user is vulnerable to subsequent viral attacks. In some host systems, the virus scanner may be integrated into the operating system in such a manner that the disablement of the virus scanner causes the entire system to become unresponsive or appear to hang.

One of the ways in which to reduce the amount of time required to perform the virus scanner is to prevent needless rescanning of objects that have previously been scanned. The method and apparatus of the present invention prevents needless rescanning of objects that have previously been scanned by validating the integrity of the object at the file system level. A file system refers to the data files (i.e. objects) in a computer system and the file management system used to keep track of those objects. The validation of the integrity of objects at the file system level is performed by taking advantage of information present in the logical structures of the storage medium in which the objects of the file system are stored. The storage medium may be a hard disk, a disk drive, a CD-ROM, and the like, all of which are referred to herein as a storage medium.

The information present in the storage medium's logical structures is maintained by the operating system's file management and real-time monitoring systems. The storage medium's logical structures may include a partition table, which defines how many partitions are formatted on the storage medium. A partition of a storage medium is a logical division of the medium created so that different operating systems can co-exist on the same medium, or to create the appearance of having separate storage media for file management, multiple users, or other purposes. The file management system maintains certain data in the partition table, such as a super-block, which contains information about the file system as a whole, an inode, which contains all file information except the file name, a directory block, which contains the file name and the number of the inode that represents the file, and a data block, which contains the location in the file system where the actual file data is stored. Taken together, the partition table data indicate the identity, location, and status (i.e. changed or not changed) of an object or group of objects in the file system.

It should be noted that the terms partition table, superblock, inode, directory block, and data block, are used herein as generic terms that describe those logical structures which are maintained by a typical file management system, including such file management systems as the File Allocation Table (FAT) system supported by most operating systems as Microsoft Windows NT, Windows 98, the Apple Macintosh OS, and some versions of UNIX operating system. Besides FAT, other file management systems include the Virtual File Allocation Table (VFAT), which handles long file names, or the File Allocation Table 32 (FAT32), which, among other advantages, allows for larger partition sizes. Yet another type of file management system is the New Technology File System (NTFS), which allows for increased fault tolerance and enhanced security as compared to other file systems. The intricacies of these and other file management systems are well-known to those skilled in the art and thus will not be discussed further except as they pertain to the present invention. It should be noted, however, that any of the above-mentioned and other file management systems may be employed without departing from the scope of the present invention.

The real-time monitoring system monitors file system events such as opening or changing an object, and creates entries in the file system partition table to record such events. The entries identify which of the super-blocks, inodes, directory blocks, and data blocks of the storage medium are occupied by the opened or changed object or objects. As with the file management systems, a number of different real-time monitoring systems may be employed without departing from the scope of the present invention. For example, the real-time monitoring system may be a VxD device driver, a network loadable module, or a UNIX daemon. The intricacies of these and other real-time monitoring systems are well-known to those skilled in the art and thus will not be discussed further except as they pertain to the present invention. It should be noted, however, that any of the above-mentioned and other real-time monitoring systems may be employed without departing from the scope of the present invention.

Figure 1:
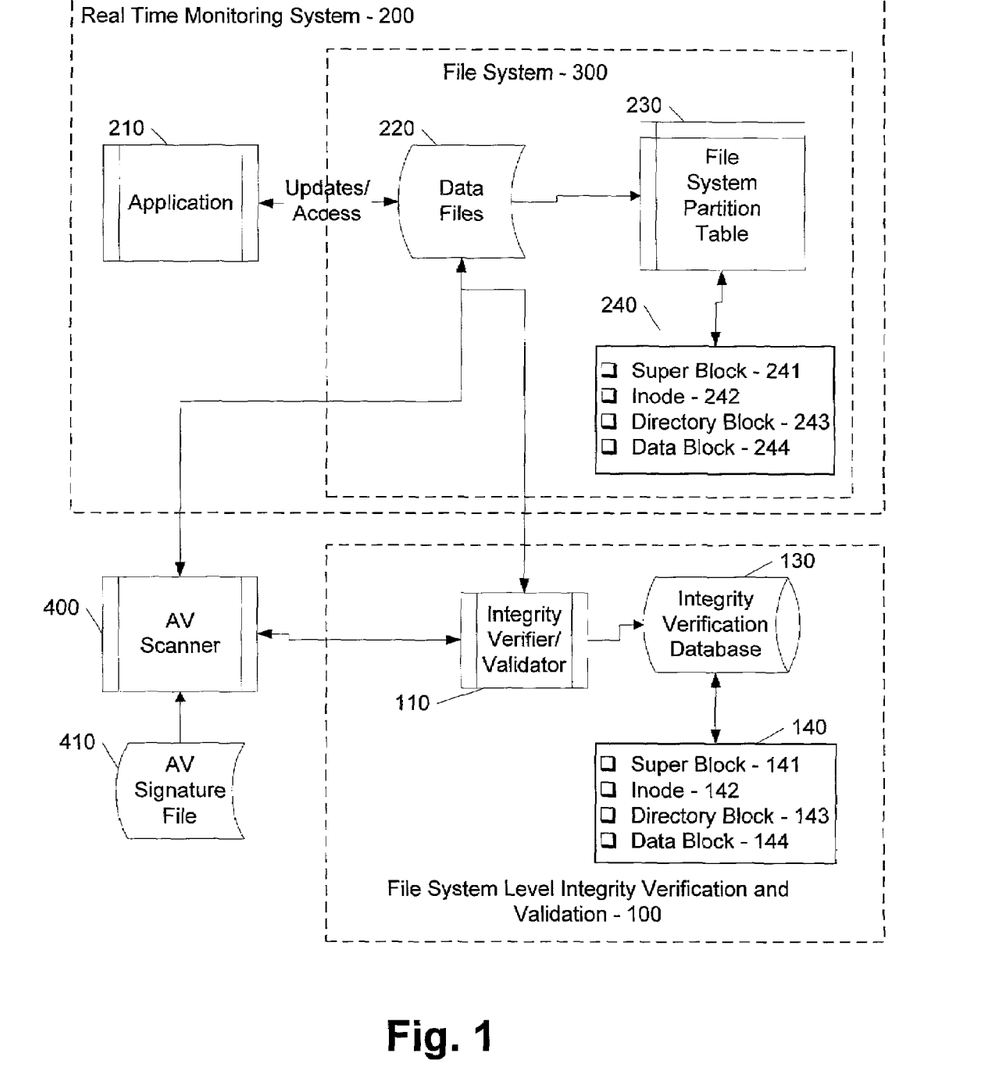
FIG. 1 is a block diagram illustrating one generalized embodiment of a file system level integrity verification and validation process incorporating the invention, and the operating environment in which certain aspects of the illustrated invention may be practiced.

FIG. 1 is a block diagram illustrating one generalized embodiment of a file system level integrity verification and validation process 100 incorporating the invention, and the operating environment in which certain aspects of the illustrated invention may be practiced. The illustrated file system level integrity verification and validation process 100 operates in conjunction with a real time monitoring system 200, a file system 300 and an AV scanner 400. An example of an AV scanner 400 that may be employed in the present invention is the anti-virus program sold under the registered trademark, McAfee VirusScan, by Network Associates, Inc., of Santa Clara, Calif. However, other AV scanners may be employed without departing from the scope of the present invention.

The real-time monitoring system 200 is known in the art, and monitors file system events such as an attempt by an application 210 to open or modify a data file 220. Each file system event causes an entry to be made in a file system partition table 230 in accordance with the operating system's file system 300. The file system 300 is also known in the art, and is comprised of, among other things, the data files 220 and an associated file system partition table 230. The file system partition table 230 is comprised of a number of data structures 240 that keep track of the data files 220 on a disk or a partition of a storage medium, and the way the data files 220 are organized.

The real-time monitoring system 200 and file system 300, including the file system partition table 230, and associated data structures 240, may vary from one operating system to another. But all operating systems have some type of real-time operating system 200 and file system 300 that create and maintain a partition table-like collection of data structures that are identical or similar to those illustrated in the partition table 230 and corresponding data structures 240. For example, the illustrated file system level integrity verification and validation process 100 may be performed on Apple Macintosh, UNIX, or Microsoft file objects, as long as the underlying operating system has some type of real-time monitoring and file systems to manage the objects within that system. In addition, the illustrated file system level integrity verification and validation process 100 may be performed on container objects or embedded objects using the real-time monitoring and file systems that manage those objects, such as Microsoft's Object Linking and Embedding (OLE) technology, or the Component Object Model (COM) technology.

In one embodiment, data structures 240 include a super block 241, which contains information about the file system 300 as a whole, an inode 242, which contains all file information except the file name, the directory block 243, which contains the file name and the number of the inode that represents the file, and the data block 244, which contains the location in the file system 300 where the actual file data is stored. Other combinations of data structures 240 may be employed without departing from the scope of the present invention.

In one embodiment, an integrity verifier and validator 110 performs an initial anti-virus scan against an entire file system to verify the integrity of the file system and create a corresponding file system level integrity verification database 130. The database 130 contains a copy of the file system's partition table data structures 240, including entries for the corresponding super blocks 141, inodes 142, directory blocks 143, and data blocks 144. In one embodiment, the database 130 may contain a copy of some or all of the data structures 240 without departing from the scope of the invention. In particular, the database 130 may include entries referencing the range of occupied modes 142 and directory blocks 143. An occupied inode 142 and directory block 143 indicates the presence of a file system object such as a file or a directory (i.e. a collection of files) in the file system 300. When new or updated content is detected by the real time monitoring system 200 causing updates to the file system partition table 230 and corresponding entries 240, then the integrity of the data in the corresponding occupied inodes 141 and directory blocks 142 is no longer assured, and the integrity verifier 110 flags the inodes 142 and directory blocks 143 on the database 130 for rescanning.

The flagging for rescanning may be accomplished in a number of ways, such as by setting a data field on the database 130 to an "on" or "off" value, where the "on" value is the decimal or binary value of one, and the "off" value is the decimal or binary value of zero. Other types of flagging may be used without departing from the principles of the present invention.

Subsequent attempts to rescan any portion of the file system 300 monitored by the real-time monitoring system 200, triggers the integrity validator 110 to validate whether that portion of the file system falls within any of the occupied inodes 141 or directory blocks 142 that have been flagged for rescanning. If they are not flagged, then rescanning of that portion of the file system is unnecessary as the integrity of at least that portion is assured. However, if they are flagged, then the AV Scanner 300 may rescan that portion of the file system for the presence of viruses.

Figure 2:
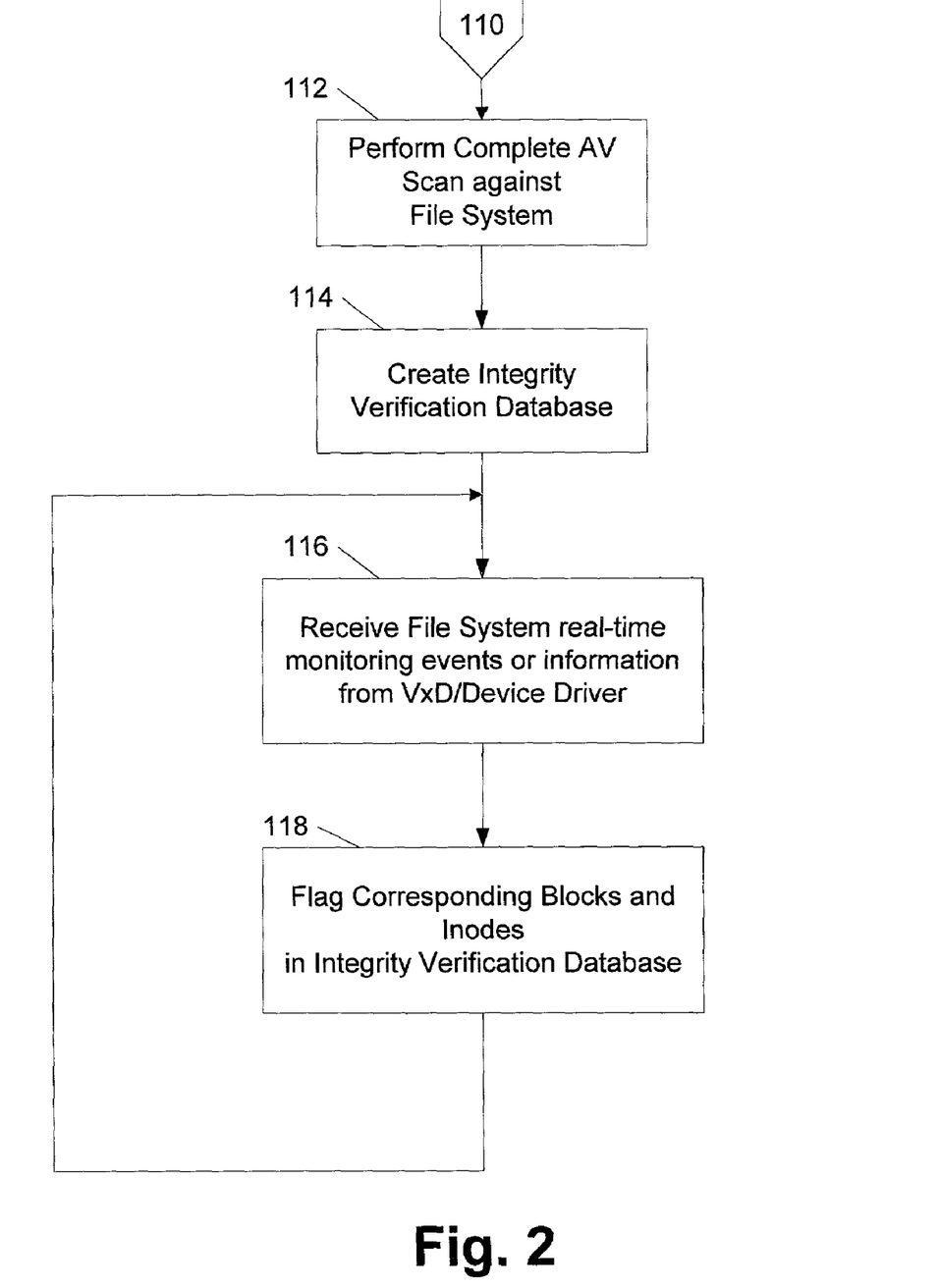
FIG. 2 is a flow diagram illustrating certain aspects of a method to be performed by a computer executing one embodiment of the illustrated invention shown in FIG. 1.
Figure 3:
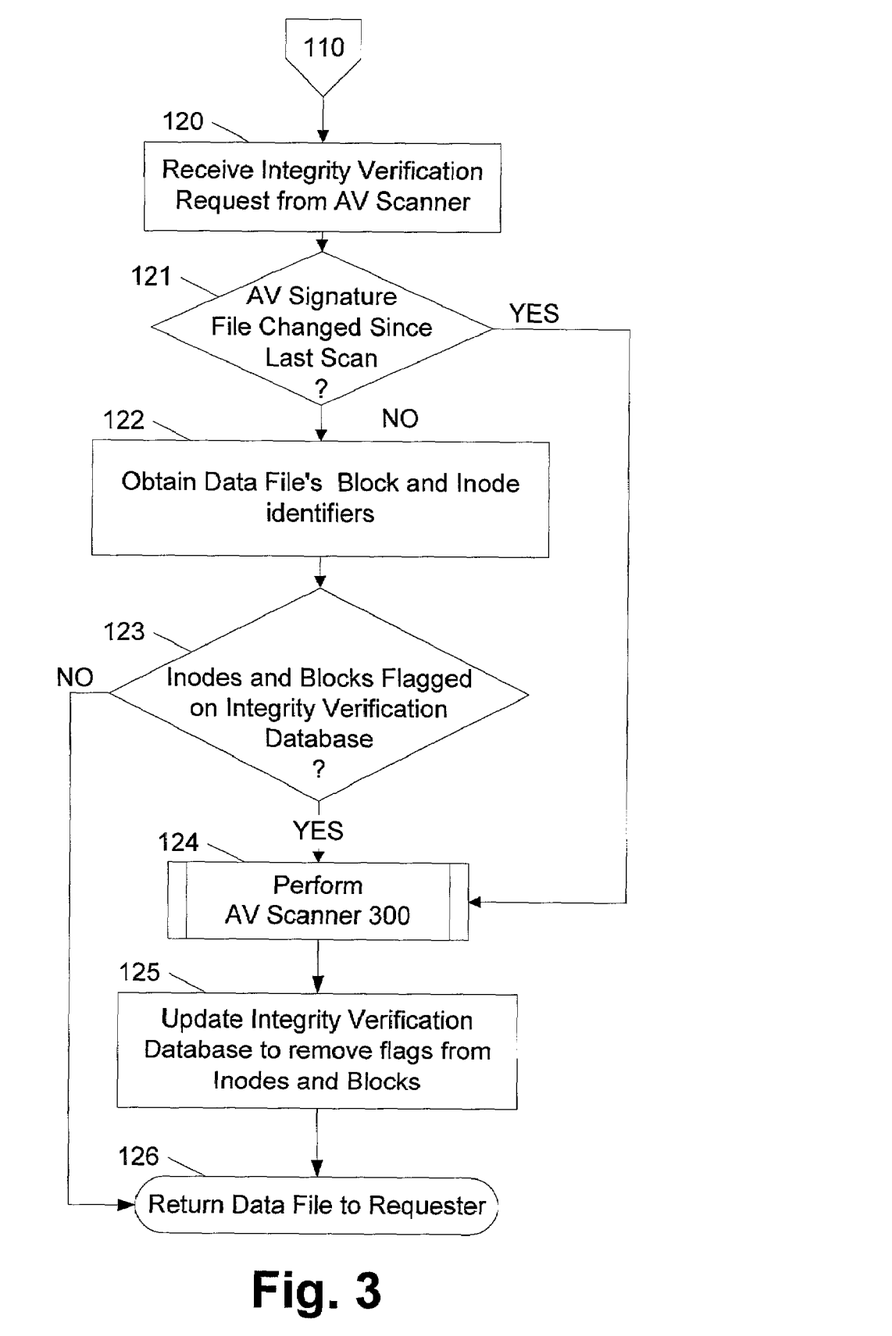
FIG. 3 is a flow diagram illustrating certain aspects of a method to be performed by a computer executing one embodiment of the illustrated invention shown in FIG. 1.

Turning now to FIGS. 2–3, the particular methods of the invention are described in terms of computer software with reference to a series of flowcharts. The methods to be performed by a computer constitute computer programs made up of computer-executable instructions. Describing the methods by reference to a flowchart enables one skilled in the art to develop such programs including such instructions to carry out the methods on suitably configured computers (the processor of the computer executing the instructions from computer-accessible media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application . . . ), as taking an action or causing a result. Such expressions are merely a shorthand way of saying that execution of the software by a computer causes the processor of the computer to perform an action or a produce a result.

Referring to FIG. 2, certain aspects of the file system level integrity verification and validation process 100 to verify the integrity of the file system are shown. In particular, FIG. 2 illustrates some of the acts to be performed by a computer executing an integrity verifier and validator 110 that incorporates one embodiment of the invention.

In one embodiment, at processing block 112, the integrity verifier and validator 110 prepares for validating the integrity of objects (described below beginning with block 120 in FIG. 3) by scanning the entire file system 300 using the AV Scanner 400. At block 114, by scanning the entire file system 300, the integrity verifier 110 is able to create an integrity verification database 130 of known scanned regions of the file system 300. A known scanned region may comprise one or more objects that do not need to be rescanned until they are changed by some file system event subsequent to the scan of the entire file system at block 114. The known scanned regions are reflected in the integrity verification database 130 by one or more super-, directory, and data blocks 141, 143, and 144 and inodes 142 that are initially unflagged, i.e. objects occupying those data blocks 141, 143, and 144 and inodes 142 do not need to be rescanned until such time as the data blocks 141, 143, and 144 and inodes 142 are flagged for rescanning as described at block 116/118 below.

At block 116, the integrity verifier 110 receives real-time monitoring events from real-time monitoring system 200. The real-time monitoring events may indicate that an object has been accessed in some way, including reading, opening, creating, or changing the object. In one embodiment, the real-time monitoring events from real-time monitoring system 200 take the form of information from a VxD device driver program running on the Microsoft Windows operating system. The VxD program performs the actual real-time monitoring of file system events. In an alternate embodiment, the real-time monitoring events from real-time monitoring system 200 take the form of information provided by a Netware Network Loadable Module (NLM), or a UNIX daemon. In one embodiment, at block 118, the integrity verifier and validator device 110 flags the super-, directory, and data blocks 141, 143, and 144 and inodes 142 in the integrity verification database 130 that correspond to the super-, directory, and data blocks 241, 243, and 244 and inodes 242 in the file system partition table 230 for which a real-time monitoring event has been detected. The integrity verifier and validator 110 processes described in blocks 116 and 118 are repeated continuously as long as the real-time monitoring system 200 is active.

Referring now to FIG. 3, certain aspects of the file system level integrity verification and validation process 100 to validate the integrity of a file system object are shown. In particular, FIG. 3 illustrates some of the acts to be performed by a computer executing an integrity verifier and validator 110 that incorporates one embodiment of the invention.

In one embodiment, at processing block 120, the integrity validator 110 begins validating the integrity of an object by receiving an integrity verification request from an AV Scanner 400. In one embodiment, the integrity verifier and validator 110 bypasses the actual integrity validation process if, at block 121, it determines that the AV Signature file 410 has changed since the last time that the object of the integrity verification request was scanned. The AV Signature file contains the latest signatures of known viruses for which the AV Scanner 400 should scan. If the AV Signature file 410 has changed, then the integrity verifier and validator 110 branches directly to performing the AV Scanner 300 at block 124. Otherwise, the integrity verifier and validator 110 continues at block 122 to obtain the block and inode identifiers for the object of the integrity verification request. The block and inode identifiers indicate which of the blocks 141/143/144 and inodes 142 of file system 300 are occupied by the object of the integrity verification request. When the object of the integrity verification request is simply a single data file 220, then there is likely only one occupied block 141/143/144 and inode 142 that need to be validated. When, as is more typically the case, the object of the integrity verification request is a collection of objects, such as an entire floppy disk, or an entire directory of data files 220, then there are likely several occupied blocks 141/143/144 and inodes 142 that need to be validated.

In one embodiment, at block 123, integrity verifier and validator 110 validates the object of the integrity verification request by determining whether the identified occupied blocks 141/143/144 and inodes 142 have been flagged during the verification process described at blocks 112–118 of the integrity verifier and validator 110. If the identified occupied blocks 141/143/144 and inodes 142 are flagged for rescanning, then at block 124, the integrity verifier and validator 110 performs the AV Scanner 300 against the object of the integrity verification request. After performing the AV Scanner 300, the integrity verifier and validator 110 updates the integrity verification database 130 to remove the flags from the identified occupied blocks 141/143/144 and inodes 142. By removing the flags, the integrity verifier and validator 110 insures that the next time an object of the integrity verification request which identifies those occupied blocks 141/143/144 and inodes 142, that the AV Scanner will be bypassed, as rescanning is unnecessary as long as the integrity of the object is validated. Finally, at block 126, the object of the integrity verification request is returned to the requester.

However, if the identified occupied blocks 141/143/144 and inodes 142 are not flagged, then the integrity verifier and validator 110 validates the integrity of the object of the request and bypasses the AV Scanner 300 by immediately branching to block 126, where the object of the integrity verification request is returned to the requester.

Figure 4:
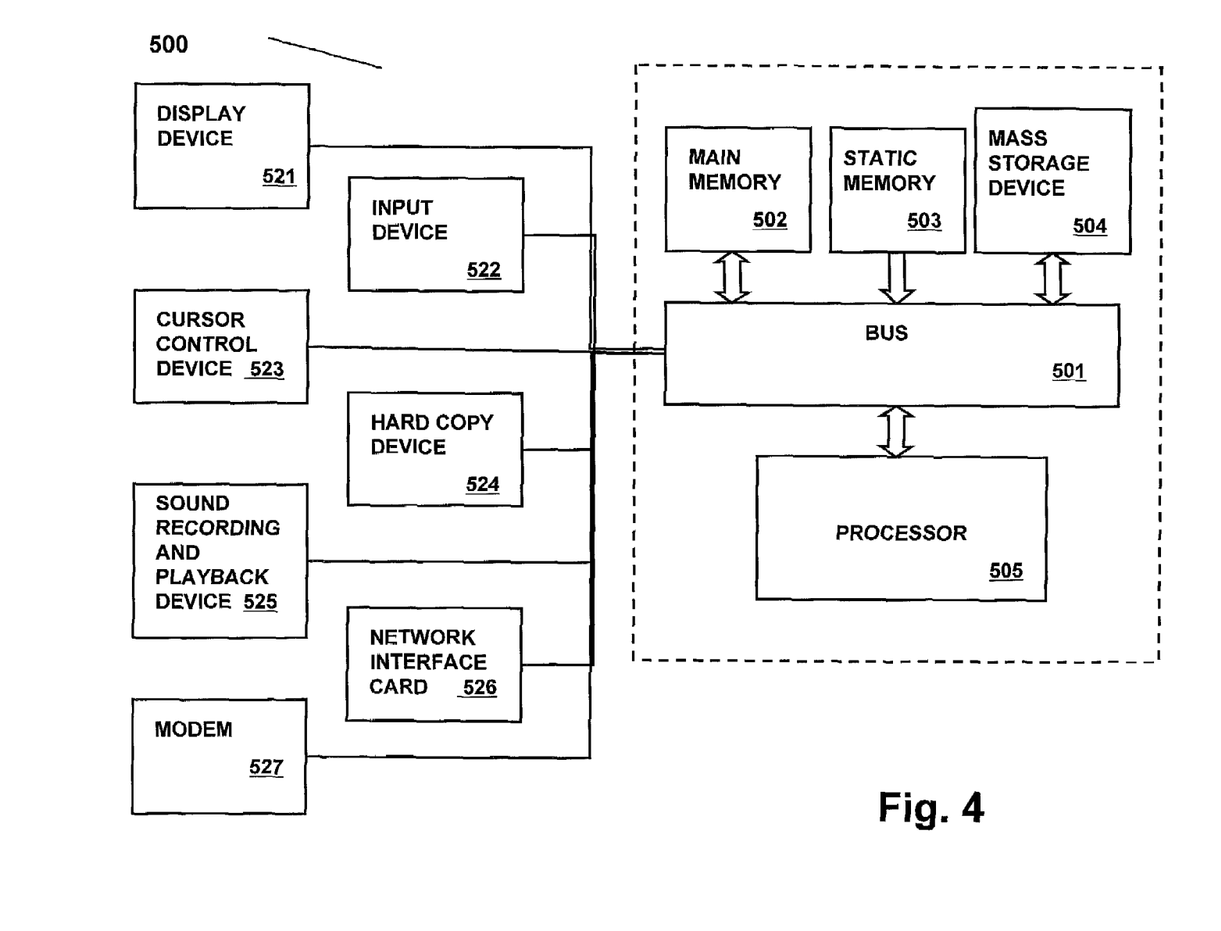
FIG. 4 illustrates a suitable computing environment in which certain aspects of the illustrated invention shown in FIGS. 1–3 may be practiced.

FIG. 4 and the following discussion are intended to provide a brief, general description of a suitable computing environment in which certain aspects of the illustrated invention may be implemented. The invention may be described by reference to different high-level program modules and/or low-level hardware contexts. Those skilled in the art will realize that program module references can be interchanged with low-level hardware instructions.

Program modules include procedures, functions, programs, components, data structures, and the like, that perform particular tasks or implement particular abstract data types. The modules may be incorporated into single and multi-processor computing systems, as well as hand-held devices and controllable consumer devices (e.g., Personal Digital Assistants (PDAs), cellular telephones, etc.). It is understood that modules may be implemented on a single computing device, or processed over a distributed network environment, where modules can be located in both local and remote memory storage devices. An exemplary system for implementing the invention includes a general-purpose computer system 500 comprising a bus 501, or other communications hardware and software, for communicating information, and a processor (or processing unit) 505 coupled with bus 501 for processing information. Computer system 500 further comprises a random access memory (RAM) or other dynamic storage device 502 (referred to as main memory), coupled to bus 501 for storing information and instructions to be executed by processor 505. Computer system 500 also comprises a read only memory (ROM) 503, and/or other static storage device, coupled to bus 501 for storing static information and instructions for processor 505. Mass storage device 504 is coupled to bus 501 for storing information and instructions. In one embodiment, the instructions comprising the file system integrity verification and validation process 100 may be stored on ROM 503. Alternatively, the instructions may be stored within mass storage device 504.

Furthermore, mass storage device 504, such as a magnetic disk or optical disk or other machine-accessible medium, and its corresponding disk drive, can be coupled to computer system 500 for accessing the information and instructions stored thereon via bus 501. Computer system 500 can also be coupled via bus 501 to a display device 521 for displaying information to a computer user such as a network manager. Display device 521 is used to display a graphical user interface to the present invention. Display device 521 can include a frame buffer, specialized graphics rendering devices, a cathode ray tube (CRT), and/or flat panel display. An input device 522, including a device with alphanumeric and other keys, or a voice command input device capable of accepting audio input is typically coupled to a bus 501 for communicating information and command selections to processor 505. Another type of user input device is a cursor control device 523, such as a mouse, a trackball, a pen, a touch screen, or cursor direction keys for communicating direction information and command selections to processor 505, and for controlling cursor movement on display device 521. This input device typically has two degrees of freedom in two axes, a first axis (e.g., the x-axis) and a second axis (e.g., the y-axis), which allows the device to specify positions in a plane. However, this invention should not be limited to input devices with only two degrees of freedom. Another device that may be coupled to bus 501 is a hard copy device 524 which may be used for printing instructions, data, or other information on a medium such as paper, film, or similar types of media. Additionally, computer system 500 can be coupled to a device for sound recording, and/or playback 525, such as an audio digitizer coupled to a microphone for recording information. Further, the device may include a speaker that is coupled to a digital to analog (D/A) converter for playing back the digitized sounds.

Network interface card 526 is coupled to bus 501. Network interface card 526 is further coupled to an external computer network (not shown). Network interface card 526, in conjunction with appropriate data communications protocols (e.g., the TCP/IP suite of internetworking protocols), provide the means by which an embodiment of the present invention operating on a general-purpose computer system 500 exchanges information with other devices coupled to the same computer network. Modem 527 is coupled to bus 501, and provides an alternate means of exchanging information with other devices for which a modem connection to an external computer network or device (not shown) can be established.

Computer system 500 and the file system integrity verification and validation process 100 stored and executed therein as part of the method and apparatus of the present invention operate in conjunction with an operating system with graphics capability, such as Microsoft's Windows or Windows CE operating systems. Commercially available computer systems implementing the features of general-purpose computer system 500 include a broad range of operating system-based computers, including server computers, desktop computers, workstations, personal digital assistants, devices, or other computer appliances. Furthermore, the present invention may be used in conjunction with various browsers (e.g. Microsoft Internet Explorer or Netscape Navigator) designed for both conventional and wireless web servers and various electronic mail applications (e.g. Microsoft Outlook, and Lotus Notes) or other messaging applications to yield an operational platform upon which an embodiment of the present invention may be implemented.

The storage systems and associated machine-accessible media provide storage of data and executable instructions for the computing device 500. Storage options include hard-drives, floppy-disks, optical storage, magnetic cassettes, tapes, flash memory cards, memory sticks, digital video disks, and the like, and may be connected to the bus 501 by way of an interface. Computing device 500 is expected to operate in a networked environment using logical connections to one or more remote computing devices through a network interface 526, modem 527, or other communication pathway. Computing devices may be interconnected by way of a network such as a local intranet or the Internet.

Having described and illustrated the principles of the invention with reference to illustrated embodiments, it will be recognized that the illustrated embodiments can be modified in arrangement and detail without departing from such principles. For example, while the foregoing description focused on verifying and validating the integrity of an object in the context of on-demand scanning of a disk or collection of files, it will be recognized that the above techniques and analyses can be applied to scanning data in other contexts such as on-access virus scanners for scanning one or more objects, and having comparable limitations.

And, even though the foregoing discussion has focused on particular embodiments, it is understood that other configurations are contemplated. In particular, even though expressions such as "in one embodiment" and the like may be used herein, such phrases are meant to generally reference embodiment possibilities, and are not intended to limit the invention to particular embodiment configurations. As used herein, these phrases may reference the same or different embodiments, and unless expressly indicated otherwise, are combinable into other embodiments. Consequently, in view of the wide variety of permutations to the above-described embodiments, the detailed description is intended to be illustrative only, and should not be taken as limiting the scope of the invention.

What is claimed as the invention, therefore, is all such modifications as may come within the scope and spirit of the following claims and equivalents thereto.

What is claimed is:

1. A method for preventing needless rescanning of objects comprising:
    verifying an integrity of a file system by scanning the file system resulting in at least one known scanned region;
    creating a database of the known scanned regions of the verified file system; and
    validating an integrity of an object in the file system against the database of known scanned regions;
    wherein the verifying comprises:
    receiving a file system event from a real-time monitoring system, the file system event indicating that an object in the file system has been accessed; and
    flagging the database of known scanned regions to indicate which of the known scanned regions was occupied by the accessed object;
    wherein the validating utilizes the flagging;
    wherein the database of known scanned regions comprises a copy of a partition table data structure indicating an identity and a location of a known scanned region occupied by the object;
    wherein the partition table data structure includes an inode that contains information about the object other than name, and a directory block that contains the object name and a number of the inode of the object;
    wherein flagging comprises indicating which of the inodes and directory blocks were occupied by the accessed object.

2. The method of claim 1, wherein verifying the integrity of the file system comprises scanning the objects in the file system for a presence of viruses.

3. The method of claim 1, wherein the partition table data structure includes a super block that contains information about the file system as a whole, and a data block that contains a location in the file system where the object is stored.

4. The method of claim 3, wherein validating the integrity of an object comprises determining that the object does not occupy a flagged known scanned region.

5. The method of claim 1, wherein validating the integrity of an object comprises determining that the object does not occupy a flagged inode and directory block.

6. The method of claim 1 further comprising:
    rescanning the object when the integrity of the object has not been validated; and
    bypassing rescanning the object when the integrity of the object has been validated.

7. The method of claim 1, wherein the real-time monitoring system is a virtual device driver (VxD) program.

8. The method of claim 1, wherein the real-time monitoring system is a UNIX daemon.

9. The method of claim 1, wherein the real-time monitoring system is a network loadable module.

10. An apparatus comprising:
    a machine-accessible medium having stored thereon executable instructions to cause a computer to perform:
    verifying an integrity of a file system by scanning the file system resulting in at least one known scanned region;
    creating a database of known scanned regions of the verified file system; and
    validating the integrity of an object in the file system against the database of known scanned regions;
    wherein the verifying comprises:
    receiving a file system event from a real-time monitoring system, the file system event indicating that an object in the file system has been accessed; and
    flagging the database of known scanned regions to indicate which of the known scanned regions was occupied by the accessed object;
    wherein the validating utilizes the flagging;
    wherein the database of known scanned regions comprises a copy of a partition table data structure indicating an identity and a location of the known scanned region occupied by the object;
    wherein the partition table data structure includes at least one of an inode that contains information about the object other than name and a directory block that contains the object name and a number of the inode of the object;
    wherein flagging comprises indicating which of the inodes or directory blocks were occupied by the accessed object.

11. The apparatus of claim 10, wherein verifying the integrity of the file system comprises scanning every object in the file system for the presence of viruses.

12. The apparatus of claim 10, wherein the partition table data structure includes a super block that contains information about the file system as a whole, and a data block that contains a location in the file system where the object is stored.

13. The apparatus of claim 10, wherein validating the integrity of an object comprises determining that the object does not occupy a flagged region.

14. The apparatus of claim 10, wherein the instructions for validating the integrity of an object comprises determining that the object does not occupy a flagged inode and directory block.

15. The apparatus of claim 10 further comprising instructions to cause a computer to perform:
    rescanning the object when the integrity of the object has not been validated; and
    bypassing rescanning the object when the integrity of the object has been validated.

16. The apparatus of claim 10, wherein the real-time monitoring system is a virtual device driver (VxD) program.

17. The apparatus of claim 10, wherein the real-time monitoring system is a UNIX daemon.

18. The apparatus of claim 10, wherein the real-time monitoring system is a network loadable module.

19. A device including a computer readable medium, comprising:
    a verifier to verify the integrity of a file system by scanning the file system resulting in at least one known scanned region;
    a database of the known scanned regions of the verified file system; and a validator to validate the integrity of an object in the file system against the database of known scanned regions;

wherein the verifying comprises:
receiving a file system event from a real-time monitoring system, the file system event indicating that an object in the file system has been accessed; and
flagging the database of know scanned regions to indicate which of the known scanned regions was occupied by the accessed object;
wherein the validating utilizes the flagging;
wherein the database of know scanned regions comprises a copy of a partition table data structure indicating an identity and a location of a known scanned region occupied by the object;
wherein the partition table data structure includes an inode that contains information about the object other than name, and a directory block that contains the object name and a number of the inode of the object;
wherein flagging comprises indicating which of the partition table data structures were occupied by the accessed object.

20. The device of claim 19, wherein the verifier verifies the integrity of the file system by scanning the objects in the file system for the presence of viruses.

21. The device of claim 19, wherein the partition table data structure includes a super block that contains information about the file system as a whole, and a data block that contains a location in the file system where the object is stored.

22. The device of claim 19, wherein the validator validates the integrity of an object by determining that the object does not occupy a flagged known scanned region.

23. The device of claim 19, wherein the validator validates the integrity of an object by determining that the object does not occupy a flagged partition table data structure.

24. The device of claim 19, further comprising:
an AV scanner to rescan the object when the integrity of the object has not been validated, wherein rescanning is bypassed when the integrity of the object has been validated.

25. The device of claim 19, wherein the real-time monitoring system is a virtual device driver (VxD) program.

26. The device of claim 19, wherein the real-time monitoring system is a UNIX daemon.

27. The device of claim 19, wherein the real-time monitoring system is a network loadable module.

28. A computer system comprising:
a processor coupled to a system bus;
a memory coupled to the processor through the system bus;
a machine-accessible medium coupled to the processor through the system bus;
an integrity process executed from the machine-accessible medium by the processor, wherein the integrity process causes the processor to verify the integrity of a file system resulting in at least one known scanned region, to create a database of known scanned regions of the verified file system, and to validate the integrity of an object in the file system against the database of known scanned regions;
wherein the verifying comprises:
receiving a file system event from a real-time monitoring system, the file system event indicating that an object in the file system has been accessed; and
flagging the database of known scanned regions to indicate which of the known scanned regions was occupied by the accessed object;
wherein the validating utilizes the flagging;
wherein the database of known scanned regions comprises a copy of a partition table data structure indicating an identity and a location of a known scanned region occupied by the object;
wherein the partition table data structure includes an anode that contains information about the object other than name, and a directory block that contains the object name and a number of the inode of the object;
wherein the system causes the processor to flag the database of known regions to indicate which of the inodes and directory blocks were occupied by the accessed object.

29. The computer system of claim 28, wherein the system causes the processor to verify the integrity of the file system by scanning the objects in the file system for the presence of viruses.

30. The computer system of claim 28, wherein the partition table data structure includes a super block that contains information about the file system as a whole, and a data block that contains a location in the file system where the object is stored.

31. The computer system of claim 28, wherein the system causes the processor to validate the integrity of an object by determining that the object does not occupy a flagged known scanned region.

32. The computer system of claim 28, wherein the system causes the processor to validate the integrity of an object by determining that the object does not occupy a flagged inode and directory block.

33. The computer system of claim 28, wherein the system further causes the processor to:
rescan the object when the integrity of the object has not been validated; and
bypass the rescan of the object when the integrity of the object has been validated.

34. The computer system of claim 28, wherein the real-time monitoring system is a virtual device driver (VxD) program.

35. The computer system of claim 28, wherein the real-time monitoring system is a UNIX daemon.

36. The computer system of claim 28, wherein the real-time monitoring system is a network loadable module.

* * * * *